United States Patent
Schoenmackers et al.

(10) Patent No.: US 12,020,701 B2
(45) Date of Patent: *Jun. 25, 2024

(54) DETECTION OF MISSION CHANGE IN CONVERSATION

(71) Applicant: eBay Inc., San Jose, CA (US)

(72) Inventors: Stefan Schoenmackers, El Paso, TX (US); Amit Srivastava, San Jose, CA (US); Lawrence William Colagiovanni, Issaquah, WA (US); Sanjika Hewavitharana, Milpitas, CA (US); Ajinkya Gorakhnath Kale, San Jose, CA (US); Vinh Khuc, San Jose, CA (US)

(73) Assignee: EBAY INC., San Jose, CA (US)

( * ) Notice: Subject to any disclaimer, the term of this patent is extended or adjusted under 35 U.S.C. 154(b) by 330 days.

This patent is subject to a terminal disclaimer.

(21) Appl. No.: 17/490,788

(22) Filed: Sep. 30, 2021

(65) Prior Publication Data

US 2022/0020375 A1 Jan. 20, 2022

Related U.S. Application Data

(63) Continuation of application No. 15/926,299, filed on Mar. 20, 2018, now Pat. No. 11,170,769.
(Continued)

(51) Int. Cl.
*G10L 15/22* (2006.01)
*G06F 16/332* (2019.01)
(Continued)

(52) U.S. Cl.
CPC .......... *G10L 15/22* (2013.01); *G06F 16/3329* (2019.01); *G06F 40/35* (2020.01);
(Continued)

(58) Field of Classification Search
None
See application file for complete search history.

(56) References Cited

U.S. PATENT DOCUMENTS 5,905,789 A 5/1999 Will
6,144,938 A 11/2000 Surace et al.
(Continued)

FOREIGN PATENT DOCUMENTS

CN 1306271 A 8/2001
CN 102419769 A 4/2012
(Continued)

OTHER PUBLICATIONS

"U.S. Appl. No. 15/926,299, Examiner Interview Summary dated Sep. 2, 2020", 4 pgs.
(Continued)

*Primary Examiner* — Neeraj Sharma
(74) *Attorney, Agent, or Firm* — SCHWEGMAN LUNDBERG & WOESSNER, P.A.

(57) ABSTRACT

Methods, systems, and computer programs are presented for detecting a mission changes in a conversation. A user utterance from a user device is received. The user utterance is part of a conversation with an intelligent assistant. The conversation includes preceding user utterances in pursuit of a first mission. It is determined that the user utterance indicates a mission change from the first mission to a second mission based on an application of a machine-learned model to the user utterance and the preceding user utterances. The machine-learned model has been trained repeatedly with past utterances of other users over a time period, the determining based on a certainty of the indication satisfying a certainty threshold. Responsive to the determining that the user utterance indicates the mission change from the first mission to a second mission, a reply to the user utterance is
(Continued)

generated to further the second mission rather than the first mission.

18 Claims, 11 Drawing Sheets

Related U.S. Application Data

(60) Provisional application No. 62/473,816, filed on Mar. 20, 2017.

(51) Int. Cl.
    *G06F 40/35*    (2020.01)
    *G10L 15/07*    (2013.01)
    *G10L 15/18*    (2013.01)
    *G10L 15/26*    (2006.01)

(52) U.S. Cl.
    CPC .......... *G10L 15/07* (2013.01); *G10L 15/1815* (2013.01); *G10L 15/26* (2013.01); *G10L 2015/228* (2013.01)

(56) References Cited

U.S. PATENT DOCUMENTS

| | | | |
|---|---|---|---|
| 6,236,968 B1 | 5/2001 | Kanevsky et al. | |
| 6,731,307 B1 | 5/2004 | Strubbe et al. | |
| 6,757,362 B1 | 6/2004 | Cooper et al. | |
| 7,181,438 B1* | 2/2007 | Szabo | G06Q 30/0269 |
| | | | 705/14.27 |
| 7,831,433 B1 | 11/2010 | Belvin et al. | |
| 8,473,293 B1* | 6/2013 | Mengibar | G10L 15/06 |
| | | | 704/10 |
| 8,577,671 B1 | 11/2013 | Barve et al. | |
| 9,223,786 B1 | 12/2015 | Hamrick et al. | |
| 9,276,855 B1* | 3/2016 | Mengle | G06Q 30/0625 |
| 9,940,659 B1* | 4/2018 | Behbahani | G06Q 30/0625 |
| 10,872,350 B1* | 12/2020 | Hu | G06Q 30/0256 |
| 11,023,947 B1* | 6/2021 | Bosley | G06Q 30/0631 |
| 11,170,769 B2 | 11/2021 | Schoenmackers et al. | |
| 11,463,578 B1* | 10/2022 | De Sanctis | G06Q 20/1235 |
| 11,676,192 B1* | 6/2023 | Moore | G06Q 30/0631 |
| | | | 705/26.7 |
| 2003/0046689 A1 | 3/2003 | Gaos | |
| 2005/0033582 A1 | 2/2005 | Gadd et al. | |
| 2011/0106614 A1* | 5/2011 | Ramer | G06Q 30/02 |
| | | | 705/14.46 |
| 2011/0295607 A1 | 12/2011 | Krishnan et al. | |
| 2012/0221502 A1 | 8/2012 | Jerram et al. | |
| 2012/0296974 A1* | 11/2012 | Tabe | G06Q 50/01 |
| | | | 709/204 |
| 2013/0218339 A1 | 8/2013 | Maisonnier et al. | |
| 2013/0332162 A1 | 12/2013 | Keen | |
| 2013/0339022 A1 | 12/2013 | Baldwin et al. | |
| 2014/0163965 A1 | 6/2014 | Barve et al. | |
| 2014/0272821 A1 | 9/2014 | Pitschel et al. | |
| 2015/0120289 A1 | 4/2015 | Lev et al. | |
| 2015/0186504 A1 | 7/2015 | Gorman et al. | |
| 2015/0194148 A1 | 7/2015 | Wong et al. | |
| 2016/0240213 A1 | 8/2016 | Wen | |
| 2016/0285807 A1 | 9/2016 | Bastide et al. | |
| 2016/0357731 A1 | 12/2016 | Zorzin | |
| 2017/0069316 A1 | 3/2017 | Makino | |
| 2017/0147872 A1 | 5/2017 | Maroy | |
| 2017/0185596 A1 | 6/2017 | Spirer | |
| 2017/0316775 A1 | 11/2017 | Le et al. | |
| 2017/0337478 A1 | 11/2017 | Sarikaya et al. | |
| 2018/0089164 A1 | 3/2018 | Iida et al. | |
| 2018/0268818 A1 | 9/2018 | Schoenmackers et al. | |

FOREIGN PATENT DOCUMENTS

| | | |
|---|---|---|
| CN | 102893327 A | 1/2013 |
| CN | 105027197 A | 11/2015 |
| CN | 105138710 A | 12/2015 |
| KR | 10-2010-0029581 A | 3/2010 |
| KR | 10-2015-0034785 A | 4/2015 |
| WO | 2018/175291 A1 | 9/2018 |

OTHER PUBLICATIONS

"U.S. Appl. No. 15/926,299, Applicant's Summary of Examiner Interview, filed Sep. 17, 2020", 1 pg.

"U.S. Appl. No. 15/926,299, Examiner Interview Summary dated May 7, 2021", 2 pgs.

Chinese Patent Office, "Office Action," issued in connection with Chinese Patent Application No. 201880033380.5 dated Feb. 11, 2023 (11 pages of official copy).

Office Action received for Chinese Patent Application No. 201880033380.5, dated Sep. 28, 2022, 11 Pages.( 1 Page of English Translation & 10 pages of official Copy ).

U.S. Appl. No. 15/926,299 U.S. Pat. No. 11,170,769, filed Mar. 20, 2018, Detection of Mission Change in Conversation.

Office Action received for Korean Patent Application No. 10-2019-7030669, dated Mar. 26, 2021, 6 pages (5 pages of official copy and 1 page of English translation).

Advisory Action received for U.S. Appl. No. 15/926,299, dated Sep. 15, 2020, 4 pages.

Final Office Action received for U.S. Appl. No. 15/926,299, dated Mar. 17, 2021, 21 pages.

Final Office Action received for U.S. Appl. No. 15/926,299, dated Jul. 9, 2020, 19 pages.

Non Final Office Action received for U.S. Appl. No. 15/926,299, dated Jan. 24, 2020, 16 pages.

Non Final Office Action received for U.S. Appl. No. 15/926,299, dated Oct. 6, 2020, 17 pages.

Notice of Allowance received for U.S. Appl. No. 15/926,299, dated Jul. 13, 2021, 21 pages.

International Preliminary Report on Patentability received for PCT Application No. PCT/US2018/023087, dated Oct. 3, 2019, 13 pages.

International Search Report received for PCT Application No. PCT/US2018/023087, dated May 24, 2018, 3 pages.

International Written Opinion received for PCT Application No. PCT/US2018/023087, dated May 24, 2018, 11 pages.

\* cited by examiner

DETECTION OF MISSION CHANGE IN CONVERSATION

CROSS REFERENCE TO RELATED APPLICATIONS

This application is a continuation of U.S. patent application Ser. No. 15/926,299 by Schoenmackers et al., entitled "Detection of Mission Change in Conversation," and filed Mar. 20, 2018; which claims the benefit of U.S. Provisional Application No. 62/473,816 by Schoenmackers et al., entitled "Detection of Mission Change in Conversation," and filed Mar. 20, 2017; each of which is incorporated by reference herein in its entirety.

TECHNICAL FIELD

The subject matter disclosed herein generally relates to the technical field of special-purpose machines that facilitate the detection of mission change in a conversation within a network service, including software-configured computerized variants of such special-purpose machines and improvements to such variants, and to the technologies by which such special-purpose machines become improved compared to other special-purpose machines that facilitate the detection of mission change in a conversation.

BACKGROUND

Conversations have a number of challenges that are absent from traditional interactions such as with a search engine or with other typed inputs. A primary one is that a user may abandon the current mission and switch to a new mission at any point in the conversation. To provide a good user experience and to help the user achieve the goals, it is important to detect when these mission changes occur.

Although mission changes are clear to a human, this problem is challenging to algorithmically address. For example, if a user seeks a first item type and is given the question "what color are you looking for", then if the user responds "red please" the user want to see red first item types, whereas if the users say "red [second item type]" the user intends to seeks a second item type instead. Syntactically those utterances are identical, but they express very different desires.

Mission changes are detectable using hand-crafted heuristic rules. However, such hand-crafting is useful only within narrow circumstances, and requires labor-intensive hand-crafting for each set of narrow circumstances.

BRIEF DESCRIPTION OF THE DRAWINGS

Various ones of the appended drawings merely illustrate example embodiments of the present disclosure and cannot be considered as limiting its scope.

DETAILED DESCRIPTION

A data-driven, machine-learning based approach identifies mission changes in a wide range of conversations. An offline phase trains the machine-learned conversation model on a set of labeled examples, including the detection of mission change. An online phase uses the trained machine-learned model to guide the conversation, including the detection of mission change at various points in the conversation. Various example embodiments are directed to the offline phase, the online phase, or a combination of the offline phase and online phase. A mission is a goal that the user is trying to reach through the conversation. For example, it might be finding a particular item, getting suggestions for an item for another, tracking a previous transaction such as an order, submitting feedback about a transaction, etc. Various examples are performed with an agent, such as an automated agent.

Various embodiments leverage a database of non-conversational network interactions with users to guide a number of simulated conversations, such that the structured representation of what the user is trying to accomplish is known already, and whether the users are continuing their current mission or starting a new mission is known already, and a machine-learned model is trained with the surface forms of how users may express that goal of the mission.

Figure 1:
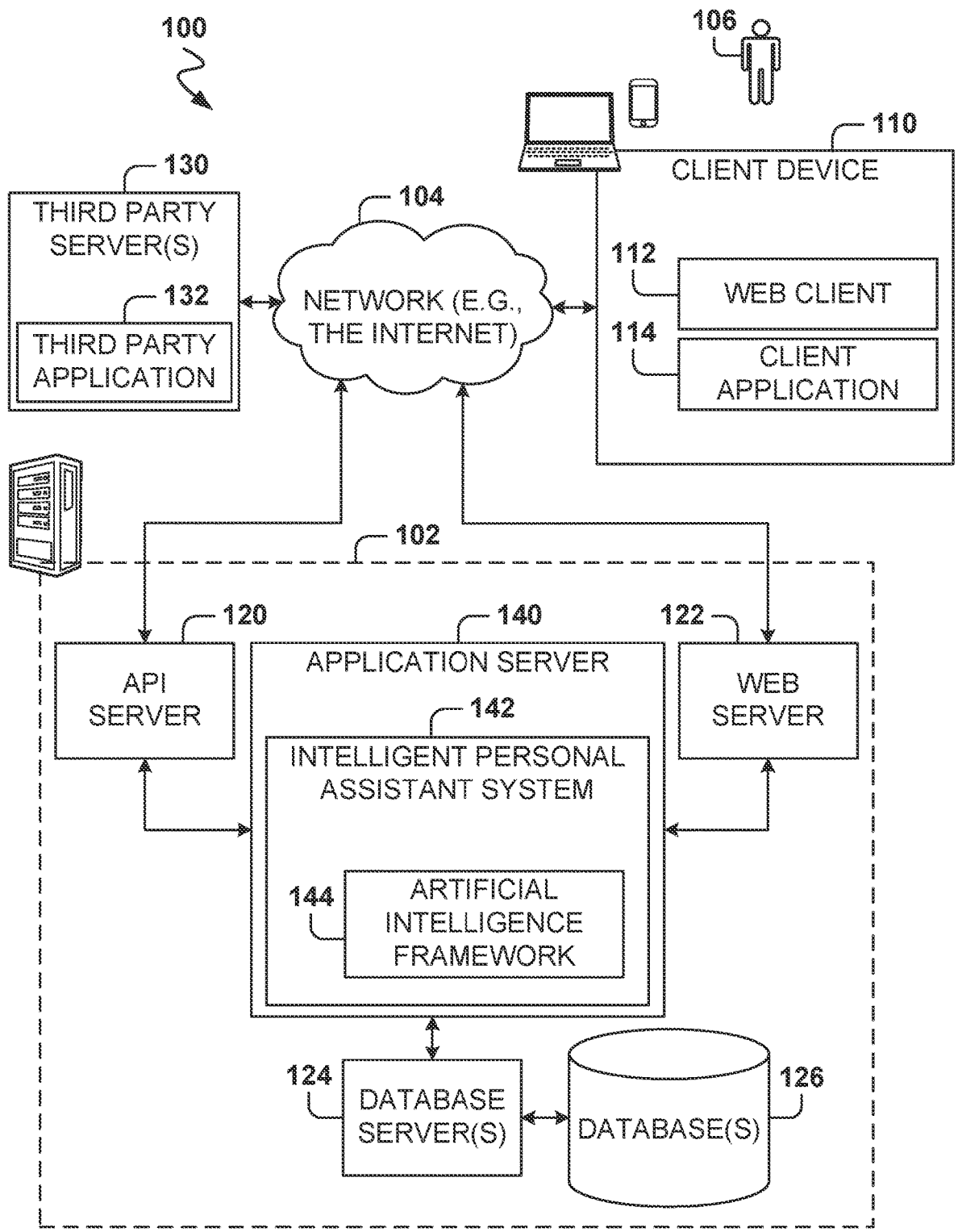
FIG. 1 is a block diagram illustrating a networked system, according to some example embodiments.

In example embodiments, methods, systems, and computer programs are presented for detecting a mission changes in a conversation. A file containing a recorded user utterance from a user device is accessed. The user utterance is part of a conversation between the user device and an intelligent assistant. The conversation includes preceding user utterances in pursuit of a first mission. It is determined that the user utterance indicates a mission change from the first mission to a second mission based on an application of a machine-learned model to the user utterance and the preceding user utterances. The machine-learned model has been trained repeatedly with past utterances of other users over a time period, the determining based on a certainty of the indication satisfying a certainty threshold. Responsive to the determining that the user utterance indicates the mission change from the first mission to a second mission, a reply to the user utterance is generated to further the second mission rather than the first mission FIG. 1 is a block diagram illustrating a networked system, according to some example embodiments. With reference to FIG. 1, an example embodiment of a high-level clientserver-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Washington State), an application 114, and a programmatic client 116 executing on client device 110.

The client device 110 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means.

For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 216 and a web server 218 are coupled to, and provide programmatic and web interfaces respectively to, one or more application servers 140. The application server 140 host the intelligent personal assistant system 142, which includes the artificial intelligence framework 144, each of which may comprise one or more modules or applications and each of which may be embodied as hardware, software, firmware, or any combination thereof.

The application server 140 is, in turn, shown to be coupled to one or more database servers 226 that facilitate access to one or more information storage repositories or databases 226. In an example embodiment, the databases 226 are storage devices that store information to be posted (e.g., publications or listings) to the publication system 242. The databases 226 may also store digital item information in accordance with example embodiments.

Additionally, a third-party application 132, executing on third-party servers 130, is shown as having programmatic access to the networked system 102 via the programmatic interface provided by the API server 216. For example, the third-party application 132, utilizing information retrieved from the networked system 102, supports one or more features or functions on a website hosted by the third party. The third-party website, for example, provides one or more promotional, marketplace, or payment functions that are supported by the relevant applications of the networked system 102.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 102 and the artificial intelligence framework system 144 could also be implemented as standalone software programs, which do not necessarily have networking capabilities.

The web client 212 may access the intelligent personal assistant system 142 via the web interface supported by the web server 218. Similarly, the programmatic client 116 accesses the various services and functions provided by the intelligent personal assistant system 142 via the programmatic interface provided by the API server 216.

Additionally, a third-party application(s) 132, executing on a third-party server(s) 130, is shown as having programmatic access to the networked system 102 via the programmatic interface provided by the API server 114. For example, the third-party application 132, utilizing information retrieved from the networked system 102, may support one or more features or functions on a website hosted by the third party. The third-party website may, for example, provide one or more promotional, marketplace, or payment functions that are supported by the relevant applications of the networked system 102.

Figure 2:
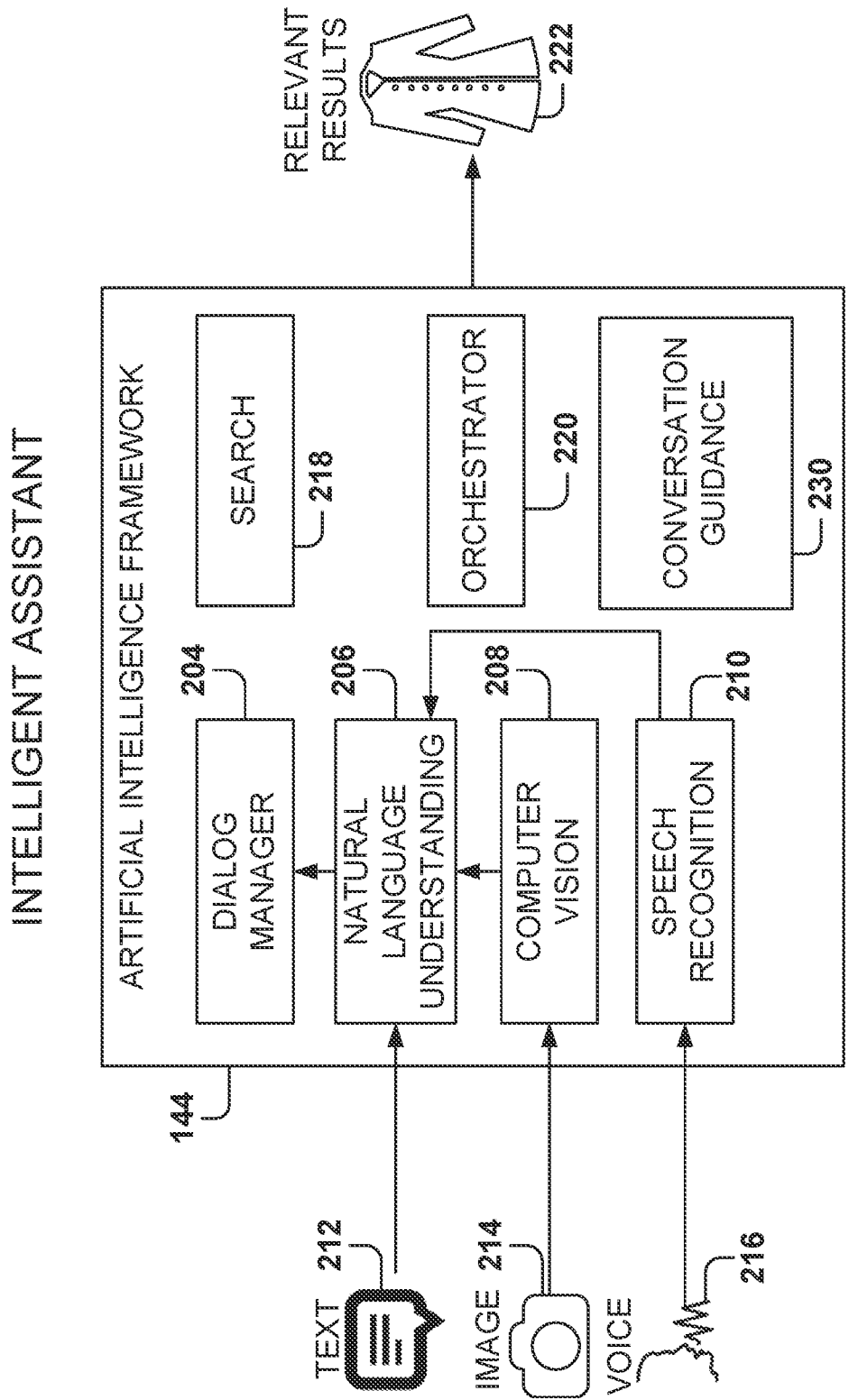
FIG. 2 is a diagram illustrating the operation of the intelligent assistant, according to some example embodiments.

FIG. 2 is a diagram illustrating the operation of the intelligent assistant, according to some example embodiments. Today's online shopping is impersonal, unidirectional, and not conversational. Buyers cannot speak in plain language to convey their wishes, making it difficult to convey intent. Shopping on a commerce site is usually more difficult than speaking with a salesperson or a friend about a product, so oftentimes buyers have trouble finding the products they want.

Embodiments present a personal shopping assistant, also referred to as an intelligent assistant, that supports a two-way communication with the shopper to build context and understand the intent of the shopper, enabling delivery of better, personalized shopping results. The intelligent assistant has a natural, human-like dialog, which helps a buyer with ease, increasing the likelihood that the buyer will reuse the intelligent assistant for future purchases.

The artificial intelligence framework 144 understands the user and the available inventory to respond to natural-language queries and has the ability to deliver an incremental improvements in anticipating and understanding the customer and their needs.

The artificial intelligence framework (AIF) 144 includes a dialogue manager 504, natural language understanding (NLU) 206, conversation guidance 230, speech recognition 210, search 218, orchestrator 220, and saliency-based object counting and localization. The AIF 144 is able to receive different kinds of inputs, such as text input 212, image input 214 and voice input 216, to generate relevant results 222. As used herein, the AIF 144 includes a plurality of services (e.g., NLU 206, conversation guidance 230) that are implemented by corresponding servers, and the terms service or server may be utilized to identify the service and the corresponding service.

The natural language understanding (NLU) 206 unit processes natural language text input 212, both formal and informal language, detects the intent of the text, and extracts useful information, such as objects of interest and their attributes. The natural language user input can thus be transformed into a structured query using rich information from additional knowledge to enrich the query even further. This information is then passed on to the dialog manager 504 through the orchestrator 220 for further actions with the user or with the other components in the overall system. The structured and enriched query is also consumed by search 218 for improved matching. The text input may be a query for a product, a refinement to a previous query, or other information to an object of relevance (e.g., shoe size).

The conversation guidance 230 takes conversation utterances from a user or from a bot as an input and performs conversation generation to respond with appropriate reply utterances to facilitate missions and actions of the user. The speech recognition 210 takes speech 216 as an input and performs language recognition to convert speech to text, which is then transferred to the NLU for processing. In example embodiments, the utterances are captured via an input device (e.g., a microphone) and stored as a recording (e.g., as audio data in one or more electronic files) in one or more computer memories. For example, the audio data of an audio recording may be included in one or more containers and encoded or decoded by one or more codecs. The file format may be one or more of an uncompressed, a lossless compressed, or a lossy compressed audio format.

The NLU 206 determines the object, the aspects associated with the object, how to create the search interface input, and how to generate the response. For example, the AIF 144 may ask questions to the user to clarify what the user is looking for. This means that the AIF 144 not only generates results, but also may create a series of interactive operations to get to the optimal, or close to optimal, results 222.

For example, in response to the query, "Can you find me a pair of red nike shoes?" the AIF 144 may generate the following parameters: <intent:shopping, statement-type:question, dominant-object:shoes, target:self, color:red, brand:nike>. To the query, "I am looking for a pair of sunglasses for my wife," the NLU may generate <intent:shopping, statement-type:statement, dominant-object:sunglasses, target:wife, target-gender:female>.

The dialogue manager 504 is the module that analyzes the query of a user to extract meaning, and determines if there is a question that needs to be asked in order to refine the query, before sending the query to search 218. The dialogue manager 504 uses the current communication in context of the previous communication between the user and the artificial intelligence framework 144. The questions are automatically generated dependent on the combination of the accumulated knowledge (e.g., provided by a knowledge graph) and what search can extract out of the inventory. The dialogue manager's job is to create a response for the user. For example, if the user says, "hello," the dialogue manager 504 generates a response, "Hi, my name is bot."

The orchestrator 220 coordinates the interactions between the other services within the artificial intelligence framework 144. More details are provided below about the interactions of the orchestrator 220 with other services with reference to FIG. 5.

Figure 3:
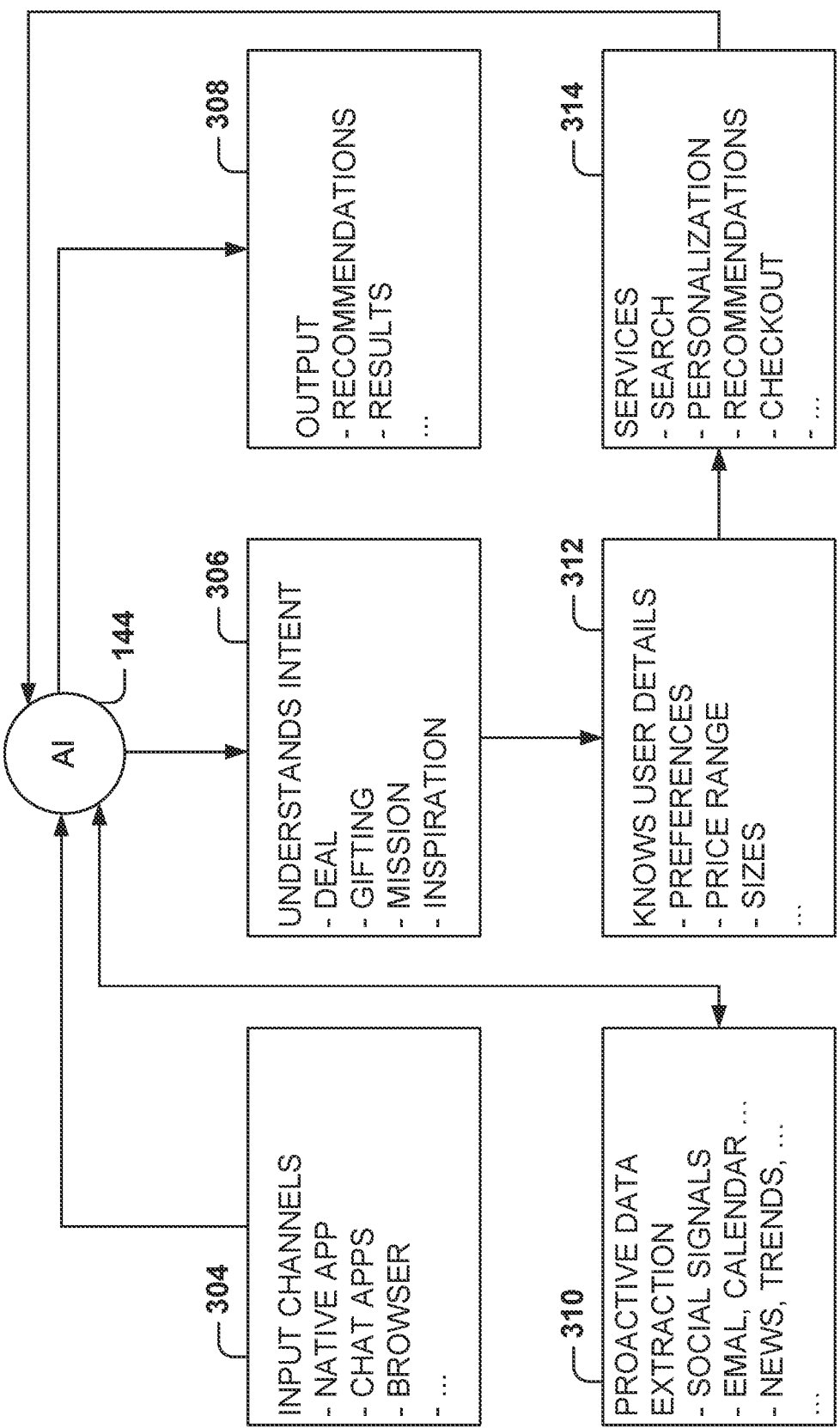
FIG. 3 illustrates the features of the artificial intelligence (AI) framework, according to some example embodiments.

FIG. 3 illustrates the features of the artificial intelligence framework (AIF) 144, according to some example embodiments. The AIF 144 is able to interact with several input channels 304, such as native commerce applications, chat applications, social networks, browsers, etc. In addition, the AIF 144 understands the intent 306 expressed by the user. For example, the intent may include a user looking for a good deal, or a user looking for a gift, or a user on a mission to buy a specific product, a user looking for suggestions, etc.

Further, the AIF 144 performs proactive data extraction 310 from multiple sources, such as social networks, email, calendar, news, market trends, etc. The AIF 144 knows about user details 312, such as user preferences, desired price ranges, sizes, affinities, etc. The AIF 144 facilitates a plurality of services within the service network, such as product search, personalization, recommendations, checkout features, etc. The output 308 may include recommendations, results, etc.

The AIF 144 is an intelligent and friendly system that understands the user's intent (e.g., targeted search, compare, shop, browse), mandatory parameters (e.g., product, product category, item), optional parameters (e.g., aspects of the item, color, size, occasion), as well as implicit information (e.g., geo location, personal preferences, age, gender). The AIF 144 responds with a well-designed response in plain language.

For example, the AIF 144 may process inputs queries, such as: "Hey! Can you help me find a pair of light pink shoes for my girlfriend please? With heels. Up to $200. Thanks;" "I recently searched for a men's leather jacket with a classic James Dean look. Think almost Harrison Ford's in the new Star Wars movie. However, I'm looking for quality in a price range of $200-300. Might not be possible, but I wanted to see!"; or "I'm looking for a black Northface Thermoball jacket."

Instead of a hardcoded system, the AIF 144 provides a configurable, flexible interface with machine learning capabilities for ongoing improvement. The AIF 144 supports a commerce system that provides value (connecting the user to the things that the user wants), intelligence (knowing and learning from the user and the user behavior to recommend the right items), convenience (offering a plurality of user interfaces), easy of-use, and efficiency (saves the user time and money).

Figure 4:
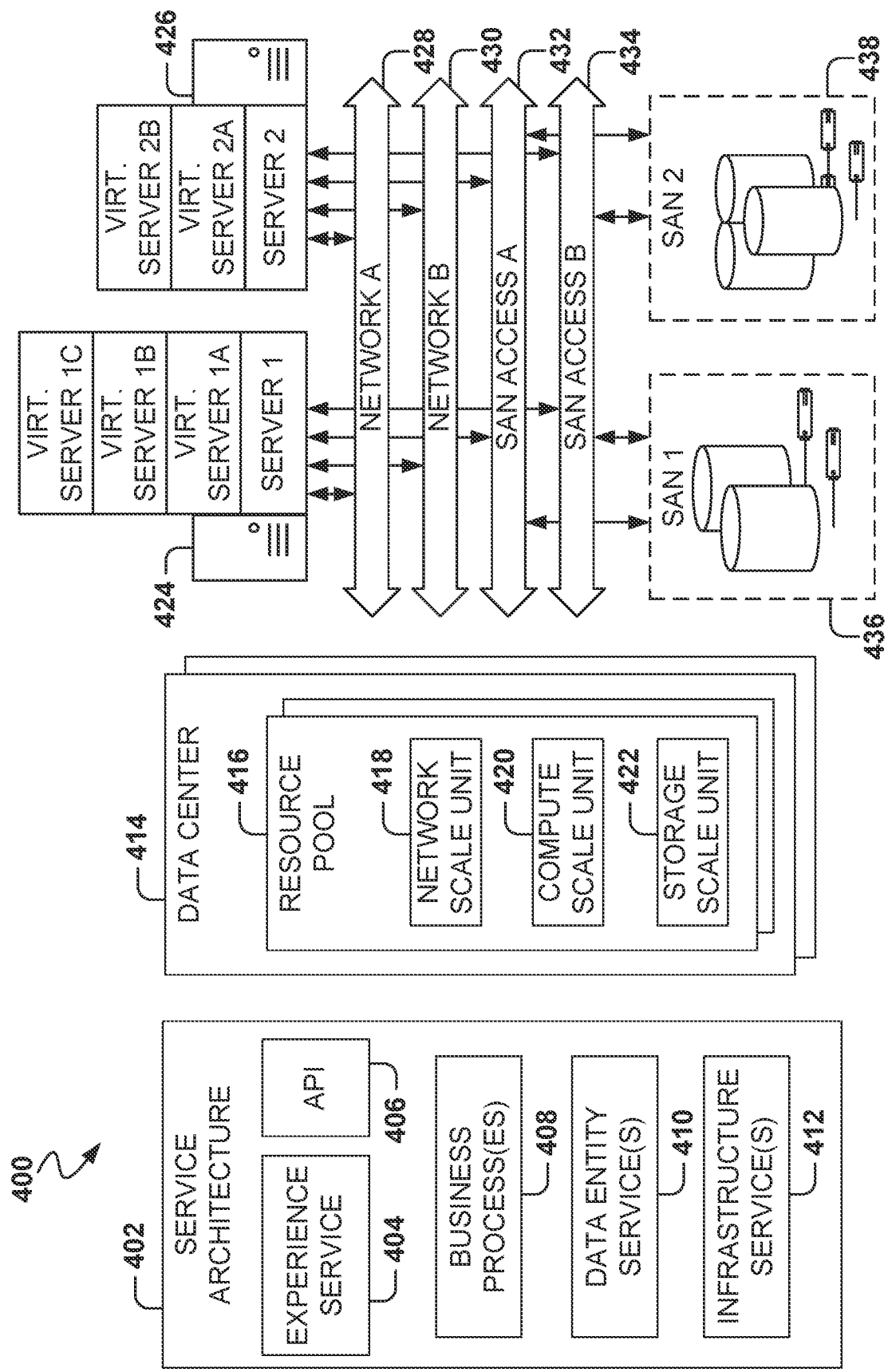
FIG. 4 is a diagram illustrating a service architecture according to some example embodiments.

FIG. 4 is a diagram illustrating a service architecture 400 according to some embodiments. The service architecture 400 presents various views of the service architecture in order to describe how the service architecture may be deployed on various data centers or cloud services. The architecture 400 represents a suitable environment for implementation of the embodiments described herein.

The service architecture 402 represents how a cloud architecture typically appears to a user, developer and so forth. The architecture is generally an abstracted representation of the actual underlying architecture implementation, represented in the other views of FIG. 1. For example, the service architecture 402 comprises a plurality of layers, that represent different functionality and/or services associated with the service architecture 402.

The experience service layer 404 represents a logical grouping of services and features from the end customer's point of view, built across different client platforms, such as applications running on a platform (mobile phone, desktop, etc.), web based presentation (mobile web, desktop web browser, etc.), and so forth. It includes rendering user interfaces and providing information to the client platform so that appropriate user interfaces can be rendered, capturing client input, and so forth. In the context of a marketplace, examples of services that would reside in this layer are home page (e.g., home view), view item listing, search/view search results, shopping cart, buying user interface and related services, selling user interface and related services, after sale experiences (posting a transaction, feedback, etc.), and so forth. In the context of other systems, the experience service layer 404 would incorporate those end user services and experiences that are embodied by the system.

The API layer 406 contains APIs which allow interaction with business process and core layers. This allows third party development against the service architecture 402 and allows third parties to develop additional services on top of the service architecture 402.

The business process service layer 408 is where the business logic resides for the services provided. In the context of a marketplace this is where services such as user registration, user sign in, listing creation and publication, add to shopping cart, place an offer, checkout, send invoice, print labels, ship item, return item, and so forth would be implemented. The business process service layer 408 also orchestrates between various business logic and data entities and thus represents a composition of shared services. The business processes in this layer can also support multi-tenancy in order to increase compatibility with some cloud service architectures.

The data entity service layer 410 enforces isolation around direct data access and contains the services upon which higher level layers depend. Thus, in the marketplace context this layer can comprise underlying services like order management, financial institution management, user account services, and so forth. The services in this layer typically support multi-tenancy.

The infrastructure service layer 412 comprises those services that are not specific to the type of service architecture being implemented. Thus, in the context of a marketplace, the services in this layer are services that are not specific or unique to a marketplace. Thus, functions like cryptographic functions, key management, CAPTCHA, authentication and authorization, configuration management, logging, tracking, documentation and management, and so forth reside in this layer.

Embodiments of the present disclosure will typically be implemented in one or more of these layers. In particular, the AIF 144, as well as the orchestrator 220 and the other services of the AIF 144.

The data center 414 is a representation of the various resource pools 416 along with their constituent scale units. This data center representation illustrates the scaling and elasticity that comes with implementing the service architecture 402 in a cloud computing model. The resource pool 416 is comprised of server (or compute) scale units 420, network scale units 418 and storage scale units 422. A scale unit is a server, network and/or storage unit that is the smallest unit capable of deployment within the data center. The scale units allow for more capacity to be deployed or removed as the need increases or decreases.

The network scale unit 418 contains one or more networks (such as network interface units, etc.) that can be deployed. The networks can include, for example virtual LANs. The compute scale unit 420 typically comprise a unit (server, etc.) that contains a plurality processing units, such as processors. The storage scale unit 422 contains one or more storage devices such as disks, storage attached networks (SAN), network attached storage (NAS) devices, and so forth. These are collectively illustrated as SANs in the description below. Each SAN may comprise one or more volumes, disks, and so forth.

The remaining view of FIG. 1 illustrates another example of a service architecture 400. This view is more hardware focused and illustrates the resources underlying the more logical architecture in the other views of FIG. 1. A cloud computing architecture typically has a plurality of servers or other systems 424, 426. These servers comprise a plurality of real and/or virtual servers. Thus the server 424 comprises server 1 along with virtual servers 1A, 1B, 1C and so forth.

The servers are connected to and/or interconnected by one or more networks such as network A 428 and/or network B 430. The servers are also connected to a plurality of storage devices, such as SAN 1 (436), SAN 2 (438) and so forth. SANs are typically connected to the servers through a network such as SAN access A 432 and/or SAN access B 434.

The compute scale units 420 are typically some aspect of servers 424 and/or 426, like processors and other hardware associated therewith. The network scale units 418 typically include, or at least utilize the illustrated networks A (428) and B (432). The storage scale units typically include some aspect of SAN 1 (436) and/or SAN 2 (438). Thus, the logical service architecture 402 can be mapped to the physical architecture.

Services and other implementation of the embodiments described herein will run on the servers or virtual servers and utilize the various hardware resources to implement the disclosed embodiments.

Figure 5:
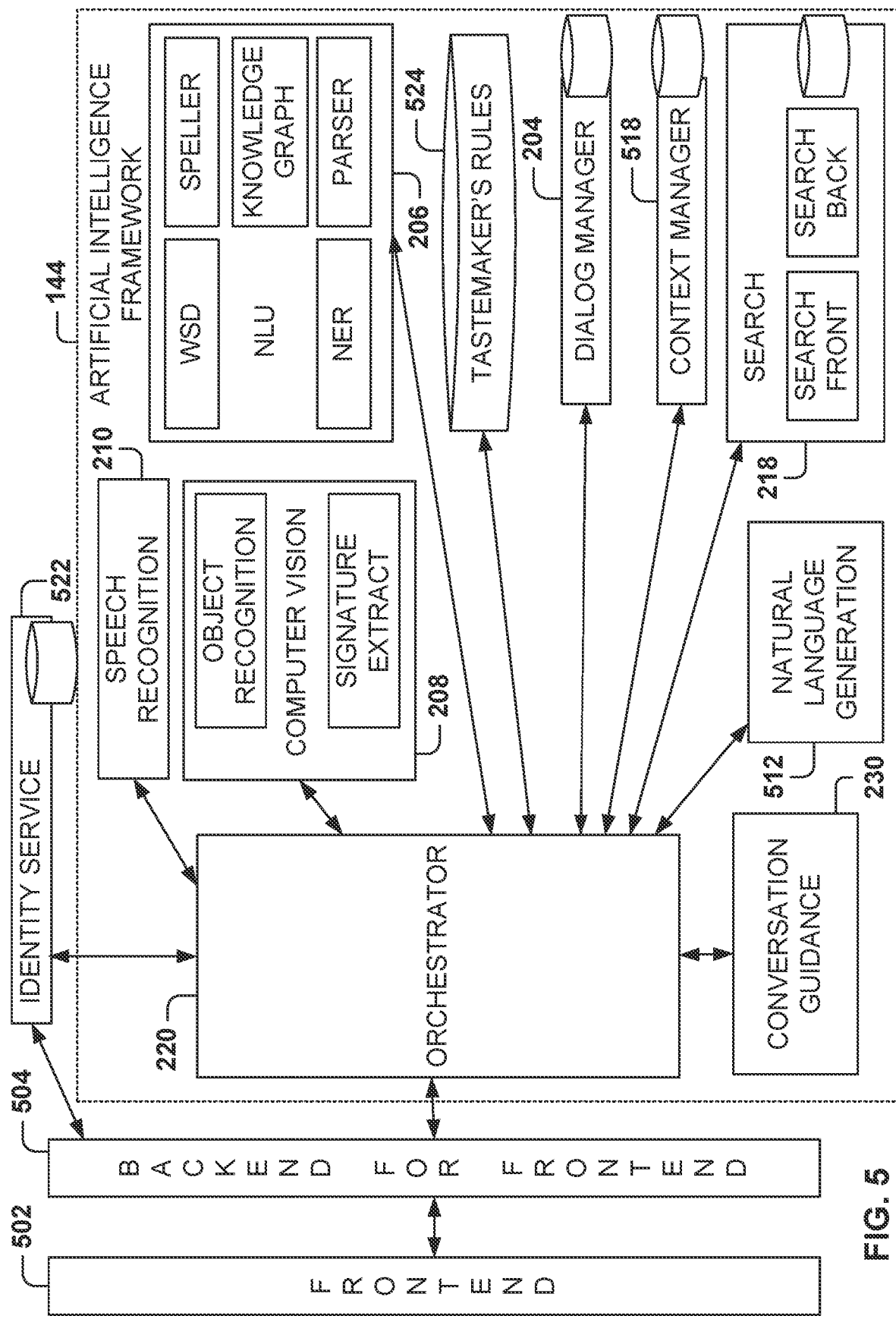
FIG. 5 is a block diagram for implementing the AI framework, according to some example embodiments.

FIG. 5 is a block diagram for implement the AIF 144, according to some example embodiments. Specifically, the intelligent personal assistant system 142 of FIG. 2 is shown to include a front end component 502 (FE) by which the intelligent personal assistant system 142 communicates (e.g., over the network 104) with other systems within the network architecture 100. The front end component 502 can communicate with the fabric of existing messaging systems. As used herein, the term messaging fabric refers to a collection of APIs and services that can power third party platforms such as Facebook messenger, Microsoft Cortana, and others "bots." In one example, a messaging fabric can support an online commerce ecosystem that allows users to interact with commercial intent. Output of the front end component 502 can be rendered in a display of a client device, such as the client device 110 in FIG. 1 as part of an interface with the intelligent personal assistant.

The front end component 502 of the intelligent personal assistant system 142 is coupled to a back end component 504 for the front end (BFF) that operates to link the front end component 502 with the AIF 144. The artificial intelligence framework 144 includes several components discussed below.

In one example embodiment, an orchestrator 220 orchestrates communication of components inside and outside the artificial intelligence framework 144. Input modalities for the AI orchestrator 206 are derived from a conversation guidance component 230, a speech recognition component 210, and a text normalization component which may form part of the speech recognition component 210. The conversation guidance component 230 may facilitate conversation with a user or bot. The speech recognition component 210 converts audio signals (e.g., spoken utterances) into text. The text normalization component operates to make input normalization, such as language normalization by rendering emoticons into text, for example. Other normalization is possible such as orthographic normalization, foreign language normalization, conversational text normalization, and so forth.

The artificial intelligence framework 144 further includes a natural language understanding (NLU) component 206 that operates to parse and extract user intent and intent parameters (for example mandatory or optional parameters). The NLU component 206 is shown to include sub-components such as a spelling corrector (speller), a parser, a named entity recognition (NER) sub-component, a knowledge graph, and a word sense detector (WSD).

The artificial intelligence framework 144 further includes a dialog manager 204 that operates to understand a "completeness of specificity" (for example of an input, such as a search query or utterance) and decide on a next action type and a parameter (e.g., "search" or "request further information from user"). In one example, the dialog manager 204 operates in association with a context manager 518 and a natural language generation (NLG) component 512. The context manager 518 manages the context and communication of a user with respect to online personal assistant (or "bot") and the assistant's associated artificial intelligence. The context manager 518 comprises two parts: long term history and short term memory. Data entries into one or both of these parts can include the relevant intent and all parameters and all related results of a given input, bot interaction, or turn of communication, for example. The NLG component 512 operates to compose a natural language utterance out of a AI message to present to a user interacting with the intelligent bot.

A search component 218 is also included within the artificial intelligence framework 144. As shown, the search component 218 has a front-end and a back-end unit. The back-end unit operates to manage item and product inventory and provide functions of searching against the inventory, optimizing towards a specific tuple of intent and intent parameters. An identity service 522 component, that may or may not form part of artificial intelligence framework 144, operates to manage user profiles, for example explicit information in the form of user attributes (e.g., "name," "age," "gender," "geolocation"), but also implicit information in forms such as "information distillates" such as "user interest," or ""similar persona," and so forth. The identity service 522 includes a set of policies, APIs, and services that elegantly centralizes all user information, enabling the AIF 144 to have insights into the users' wishes. Further, the identity service 522 protects the commerce system and its users from fraud or malicious use of private information.

A conversation guidance component 230 is also included within the artificial intelligence framework 144. The conversation guidance component 230 is discussed in connection with FIGS. 13-20.

The functionalities of the artificial intelligence framework 144 can be set into multiple parts, for example decision-making and context parts. In one example, the decision-making part includes operations by the orchestrator 220, the NLU component 206 and its subcomponents, the dialog manager 204, the NLG component 512, the conversation guidance component 230 and speech recognition component 210. The context part of the AI functionality relates to the parameters (implicit and explicit) around a user and the communicated intent (for example, towards a given inventory, or otherwise). In order to measure and improve AI quality over time, in some example embodiments, the artificial intelligence framework 144 is trained using sample queries (e.g., a development set) and tested on a different set of queries (e.g., an evaluation set), both sets to be developed by human curation or from use data. Also, the artificial intelligence framework 144 is to be trained on transaction and interaction flows defined by experienced curation specialists, or human override 524. The flows and the logic encoded within the various components of the artificial intelligence framework 144 define what follow-up utterance or presentation (e.g., question, result set) is made by the intelligent assistant based on an identified user intent.

The intelligent personal assistant system 142 seeks to understand a user's intent (e.g., targeted search, compare, shop, browse, and so forth), mandatory parameters (e.g., product, product category, item, and so forth), and optional parameters (e.g., explicit information, e.g., aspects of item/product, occasion, and so forth), as well as implicit information (e.g., geolocation, personal preferences, age and gender, and so forth) and respond to the user with a content-rich and intelligent response. Explicit input modalities can include text, speech, and visual input and can be enriched with implicit knowledge of user (e.g., geolocation, gender, birthplace, previous browse history, and so forth). Output modalities can include text (such as speech, or natural language sentences, or product-relevant information, and images on the screen of a smart device e.g., client device 110. Input modalities thus refer to the different ways users can communicate with the bot. Input modalities can also include keyboard or mouse navigation, touch-sensitive gestures, and so forth.

In relation to a modality for the conversation guidance component 230, a conversation provides convenient input and output for a user. Moreover, it is inconvenient to type complex text queries on mobile phones and long text queries typically have poor recall. Example functionalities of the conversation guidance component 230 include mission tracking, mission change, and action tracking. A bot enabled with conversation is advantageous when running on a mobile device. Powerful deep neural networks can be used to enable conversation generation applications.

With reference to the speech recognition component 210, a feature extraction component operates to convert raw audio waveform to some-dimensional vector of numbers that represents the sound. This component uses deep learning to project the raw signal into a high-dimensional semantic space. An acoustic model component operates to host a statistical model of speech units, such as phonemes and allophones. These can include Gaussian Mixture Models (GMM) although the use of Deep Neural Networks is possible. A language model component uses statistical models of grammar to define how words are put together in a sentence. Such models can include n-gram-based models or Deep Neural Networks built on top of word embeddings. A speech-to-text (STT) decoder component converts a speech utterance into a sequence of words typically leveraging features derived from a raw signal using the feature extraction component, the acoustic model component, and the language model component in a Hidden Markov Model (HMM) framework to derive word sequences from feature sequences. In one example, a speech-to-text service in the cloud has these components deployed in a cloud framework with an API that allows audio samples to be posted for speech utterances and to retrieve the corresponding word sequence. Control parameters are available to customize or influence the speech-to-text process.

Machine-learning algorithms may be used for matching, relevance, and final re-ranking by the AIF 144 services. Machine learning is a field of study that gives computers the ability to learn without being explicitly programmed. Machine learning explores the study and construction of algorithms that can learn from and make predictions on data. Such machine-learning algorithms operate by building a model from example inputs in order to make data-driven predictions or decisions expressed as outputs. Machine-learning algorithms may also be used to teach how to implement a process.

Deep learning models, deep neural network (DNN), recurrent neural network (RNN), convolutional neural network (CNN), and long short-term CNN, as well as other ML models and IR models may be used. For example, search 218 may use n-gram, entity, and semantic vector-based query to product matching. Deep-learned semantic vectors give the ability to match products to non-text inputs directly. Multi-leveled relevance filtration may use BM25, predicted query leaf category+product leaf category, semantic vector similarity between query and product, and other models, to pick the top candidate products for the final re-ranking algorithm.

Predicted click-through-rate and conversion rate, as well as GMV, constitutes the final re-ranking formula to tweak functionality towards specific business goals, more shopping engagement, more products purchased, or more GMV. Both the click prediction and conversion prediction models take in query, user, seller and product as input signals. User profiles are enriched by learning from onboarding, sideboarding, and user behaviors to enhance the precision of the models used by each of the matching, relevance, and ranking stages for individual users. To increase the velocity of model improvement, offline evaluation pipeline is used before online A/B testing.

In one example of an artificial intelligence framework 144, two additional parts for the speech recognition component 210 are provided, a speaker adaptation component and an LM adaptation component. The speaker adaptation component allows clients of an STT system (e.g., speech recognition component 210) to customize the feature extraction component and the acoustic model component for each speaker. This can be important because most speech-to-text systems are trained on data from a representative set of speakers from a target region and typically the accuracy of the system depends heavily on how well the target speaker matches the speakers in the training pool. The speaker adaptation component allows the speech recognition component 210 (and consequently the artificial intelligence framework 144) to be robust to speaker variations by continuously learning the idiosyncrasies of a user's intonation, pronunciation, accent, and other speech factors and apply these to the speech-dependent components, e.g., the feature extraction component, and the acoustic model component. While this approach utilizes a non-significant-sized voice profile to be created and persisted for each speaker, the potential benefits of accuracy generally far outweigh the storage drawbacks.

The language model (LM) adaptation component operates to customize the language model component and the speech-to-text vocabulary with new words and representative sentences from a target domain, for example, inventory categories or user personas. This capability allows the artificial intelligence framework 144 to be scalable as new categories and personas are supported.

The AIF's goal is to provide a scalable and expandable framework for AI, one in which new activities, also referred to herein as missions, can be accomplished dynamically using the services that perform specific natural-language processing functions. Adding a new service does not require to redesign the complete system. Instead, the services are prepared (e.g., using machine-learning algorithms) if necessary, and the orchestrator is configured with a new sequence related to the new activity. More details regarding the configuration of sequences are provided below with reference to FIGS. 6-13.

Embodiments presented herein provide for dynamic configuration of the orchestrator 220 to learn new intents and how to respond to the new intents. In some example embodiments, the orchestrator 220 "learns" new skills by receiving a configuration for a new sequence associated with the new activity. The sequence specification includes a sequence of interactions between the orchestrator 220 and a set of one or more service servers from the AIF 144. In some example embodiments, each interaction of the sequence includes (at least): identification for a service server, a call parameter definition to be passed with a call to the identified service server; and a response parameter definition to be returned by the identified service server.

In some example embodiments, the services within the AIF 144, except for the orchestrator 220, are not aware of each other, e.g., they do not interact directly with each other. The orchestrator 220 manages all the interactions with the other servers. Having the central coordinating resource simplifies the implementation of the other services, which need not be aware of the interfaces (e.g., APIs) provided by the other services. Of course, there can be some cases where a direct interface may be supported between pairs of services.

Figure 6:
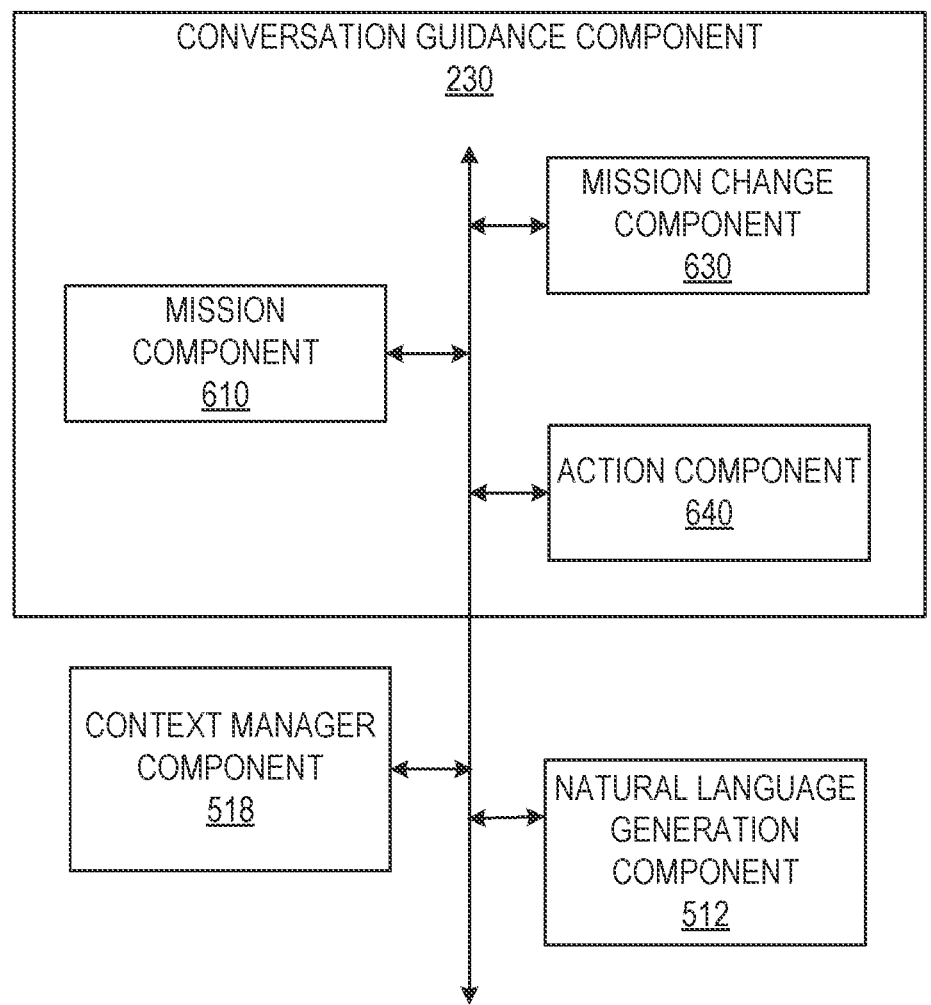
FIG. 6 is a block diagram of an example conversation generation component, according to some example embodiments.

FIG. 6 is a block diagram illustrating components of the conversation guidance component 230, according to some example embodiments. The conversation guidance component 230 is shown as including a mission component 610, a mission change component 630, and an action component 640 all configured to communicate with one another (e.g., via a bus, shared memory, or a switch). In some embodiments, the conversation guidance component 230 operates in conjunction with the context manager component 518, the natural language generation component 512, and other components of the artificial intelligence framework 144. Any one or more of the modules described herein may be implemented using hardware (e.g., one or more processors of a machine) or a combination of hardware and software. For example, any module described herein may configure a processor (e.g., among one or more processors of a machine)

to perform operations for which that module is designed. Moreover, any two or more of these modules may be combined into a single module, and the functions described herein for a single module may be subdivided among multiple modules. Furthermore, according to various example embodiments, modules described herein as being implemented within a single machine, database(s) 126, or device (e.g., client device 110) may be distributed across multiple machines, database(s) 126, or devices.

Figure 7:
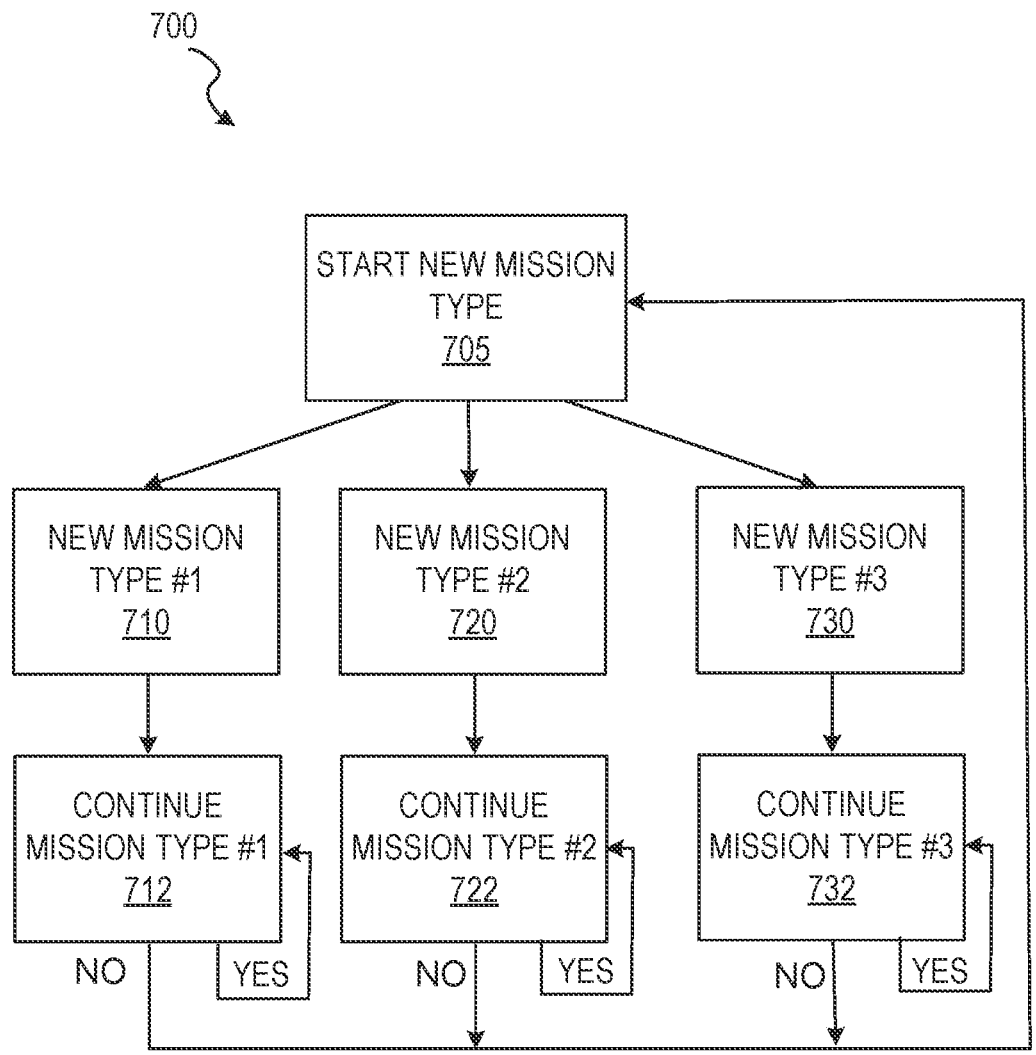
FIG. 7 is flowchart of a method of generating a conversation, including determining and continuing a mission, according to some example embodiments.

FIG. 7 is a flowchart of a method 700 of starting a new type of mission and determining whether to continue with the mission, according to some example embodiments. While the various operations in this flowchart are presented and described sequentially, one of ordinary skill will appreciate that some or all of the operations may be executed in a different order, be combined or omitted, or be executed in parallel. Operations in the method 700 may be performed by the mission component 610 of the conversation guidance component 230, using components described above with respect to FIG. 6. In some embodiments, operations of the method 700 are performed by or in conjunction with the context manager component 518, the natural language generation component 512, and other components of the artificial intelligence framework 144.

In operation 705, the mission component 610 of the conversation guidance component 230 starts a new mission type. In some embodiments, the new mission type is selected out of the operations new mission type #1 710, new mission type #2 720, and new mission type #3 730. Each new mission type is continued in the respective operations continue mission type #1 712, continue mission type #2 722, and continue mission type #3 732. Then, the mission component 610 of the conversation guidance component 230 determines whether to continue the respective mission. If yes, the respective mission is iterated. If no, then the method loops back to operation 705 to start a new mission type.

Figure 8:
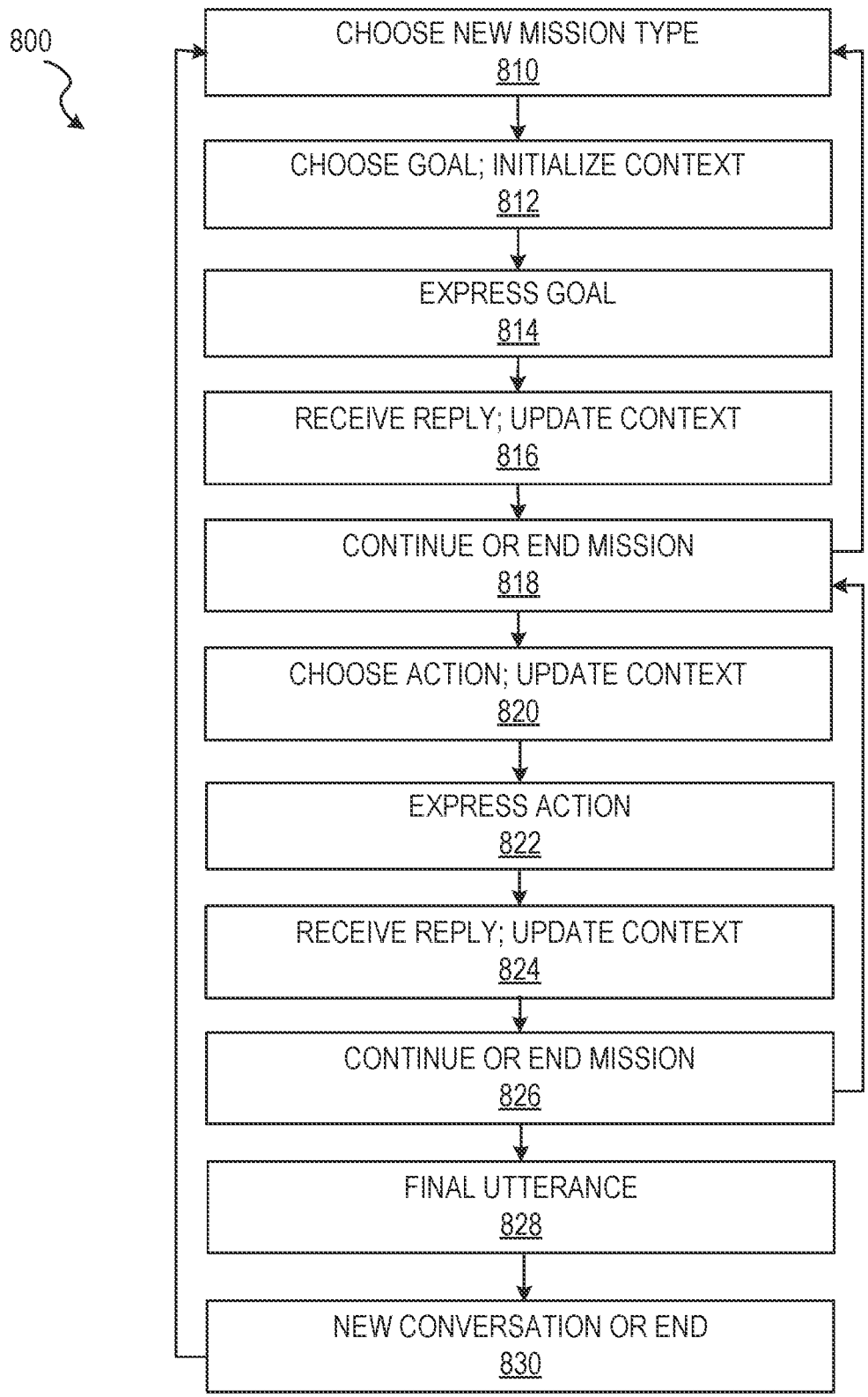
FIG. 8 is flowchart of a method of performing a conversation, according to some example embodiments.

FIG. 8 is flowchart of a method 800 of performing a conversation, according to some example embodiments. The method 800 is applicable to both the online phase and the offline phases. However, in the online phase, the method performs at one or more the steps or in between one or more steps, communication with the machine-learned model to get a prediction as to whether this is a new mission or a continuation of the present mission, and uses that to guide the system and to help track the conversation as it unfolds.

Operation 810 chooses a new mission type for the user from the supported mission types.

Operation 812 chooses a goal for that mission type (e.g. a particular starting query for a mission type), identifies any needed supporting data for that goal (e.g. the allowed refinements or actions for that query), and initializes the user's conversation context with that information.

Operation 814 calls the natural language generator to generate an utterance (e.g., in text, audio, or image form) expressing that goal for that mission type. That utterance is sent to the agent.

Operation 816 receives a reply from the agent that may be simulated or an actual agent. The context is updated based on the reply.

Operation 818, based on the current context and conversation history, chooses whether to continue the mission or end the mission. If continuing the mission, operation 820 ensues. If ending the mission, operation 810 ensues.

Operation 820, based on the current context and conversation history, chooses an action the user wants to perform at this point in the conversation. That action may be answering a question asked by the agent, specifying an additional refinement for their original query, changing a previous refinement, and/or asking a question based on the current context, etc. The context is updated with that action.

Operation 822 calls the natural language generator to generate an utterance expressing that action for that mission type, action, and context. That utterance is sent to the agent.

Operation 824 receives a reply from the agent, that may be simulated or an actual agent, and updates the context based on the reply.

Operation 826, based on the current context and conversation history, chooses whether to continue the mission or end the mission. If continuing the mission, operation 818 ensues. If ending the mission, operation 828 ensues.

Operation 828 chooses whether or not to generate a final utterance for this conversation. If so, then operation 828 calls the natural language generator and sends the final utterance to the agent (e.g. the user may say "bye" at the end of the conversation).

Operation 830 chooses whether or not to start a new conversation. If so, then operation 810 ensues.

In various example embodiments, choices may be deterministic based on desired behavior, observed user behavior, randomly chosen according to some probability, possibly taken from aggregate statistics, or chosen to highlight desired or challenging cases.

Figure 9:
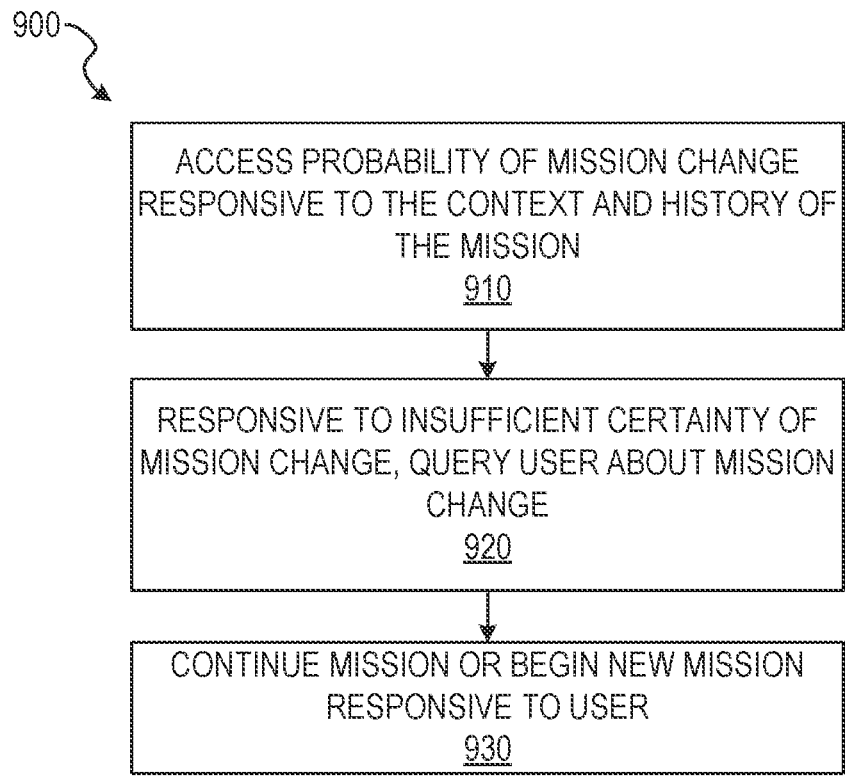
FIG. 9 is flowchart of a method of confirming a mission, according to some example embodiments.

FIG. 9 is flowchart of a method of confirming a mission, according to some example embodiments.

Operation 910 accesses the probability of a mission change, responsive to the context and history of the mission. Operation 920, responsive to insufficient certainty of mission change, queries the user about whether the mission changed. Operation 930 continues the present mission or begins a new mission, responsive to the user. In another example embodiment, if the certainty of mission change is sufficient, then the model proceeds with the new mission/ changes the mission.

If the model is uncertain about whether or not the user's latest utterance is represents a mission change (e.g. if the predicted probability of a mission change is around 50% in one example embodiment), then the agent asks for clarification directly from the user.

Rule-based mission-change detectors are typically unable to do so; rule-based mission-change detectors only emit a binary decision—begin new mission vs. continue the present mission. Such systems typically decide one way or the other, and proceed, which can lead to a bad user experience when the system is mistaken.

Figure 10:
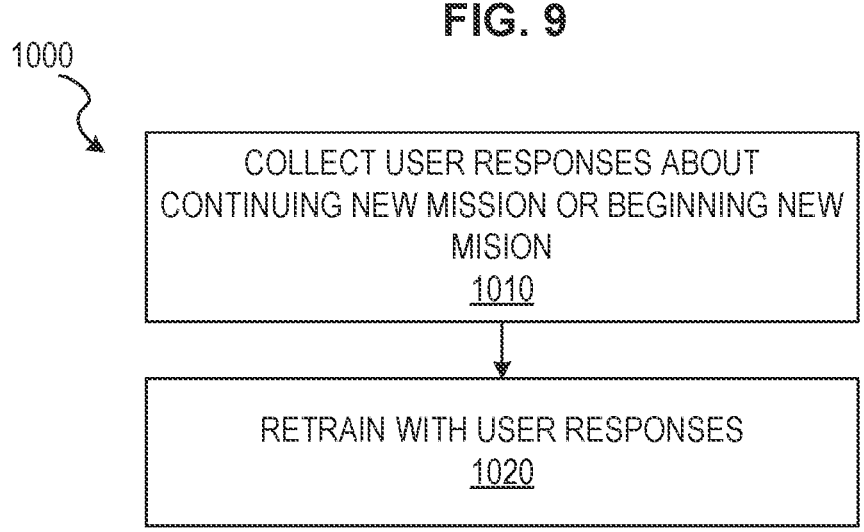
FIG. 10 is flowchart of a method of retraining a machine learning system for conversation, according to some example embodiments.

FIG. 10 is flowchart of a method of retraining a machine learning system for conversation, according to some example embodiments. In operation 1010, user responses from FIG. 9 are collected about whether to continue the present mission or begin a new mission. Operation 1020 retrains the machine-learned model with the user responses.

The user's responses in FIG. 9 can be tracked, and then used as additional labels to retrain the model. These examples are especially useful, since they are the "hard cases" where the model is uncertain.

Figure 11:
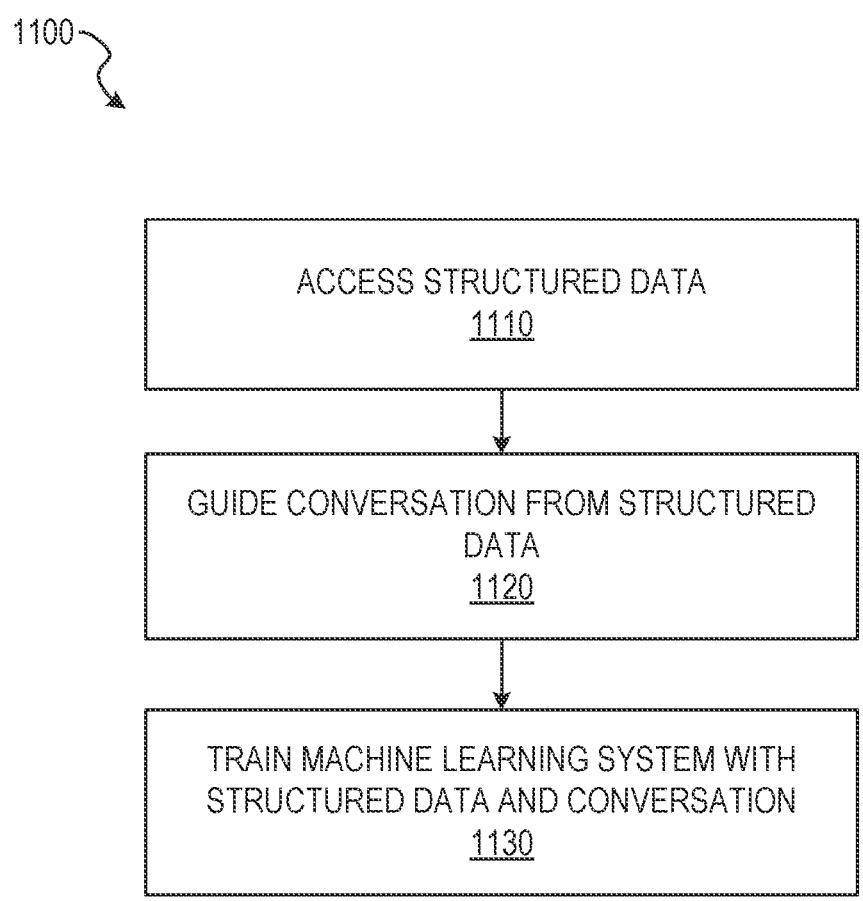
FIG. 11 is flowchart of a method of training a machine learning system for conversation, according to some example embodiments.

FIG. 11 is flowchart of a method 1100 of offline training of a machine learned system for conversation, according to some example embodiments. Operation 1110 accesses structured data, such as from databases 126 with records of previous transactions with users. In some embodiments, such records are from nonconversational interactions with users, such as search queries, such that records of nonconversational transactions are leveraged into training a conversational machine-learned model. Operation 1120 guides conversation from the structured data. Operation 1130 trains the machine-learned system with structured data and conversation. Because the source of the conversation is from past transactions with known outcomes, the training has negative and/or positive feedback to guide the machine-learned system to match the outcomes of the past transactions. Further detail follows of some example embodiments.

The offline phase begins with a number of example conversations from past transactions. In some example embodiments, the past transactions have data including, at every point in the conversation, whether the present mission continued or whether a new mission started. In other embodiments, this data is generated from explicitly asking actual users, from manually labeling, or from some other source.

A labeled training example is generated that corresponds to each turn in the conversation. This consists of 1) analysis of the utterance(s) from this turn, 2) derivation of features based on the utterance(s), its analysis, prior conversation history, derived context of the conversation and mission, etc., and 3) providing the label and the derived features to a machine learning algorithm to train a machine-learned model that will predict whether this is a new mission or mission continuation, based on the derived features.

The following describes example use cases.

The conversation analysis may include spelling correction, syntactic or semantic parsing, named entity extraction, noun phrase identification, and/or other steps. The derived features may include textual features based on the utterance, numerical features based on the results of the named entity extraction, string or word similarity between the utterance (or derived values from the utterance) and a prior utterance/question, string or word similarities to structured data based on the context and/or known values related to the current mission, or any other feature suitable to provide to the machine learning algorithm. The machine learning algorithm may be a neural network, gradient boosted machine, random forest, or any number of other algorithms. Various example embodiments provide a prediction about whether this is a new mission or continuation of the present mission, or provide a probability estimate that it is a new mission or continuation.

To simulate such conversations in an e-commerce context, the user is modeled as a state machine with context. At every turn in the conversation, the system chooses whether to remain in the current state or transitions to a new state. After making that decision, an action is chosen that the user wants to perform based on the current state of the user, plus the context of the conversation thus far. For example, the system may choose to answer the agent's question, refine some aspect of the current mission, or start a new mission with a particular goal. Once an action is decided, the simulated user's context is updated with the belief of the state of the conversation. Then a natural language representation is generated of that action and the user saying/typing/uttering/sending that to the agent is simulated. Optionally the agent's understanding of the conversation is tracked, to identify places where the user and agent disagree. Finally, at every step the state, action, context, natural language representation, context, agent response, etc. are tracked and stored for future use.

To simulate shopping queries, records of non-conversational searches are leveraged. For example, individual users are tracked, and the user interactions are transformed into a conversation. For example, a user on site may start with a text query for "Nike shoes". The user then applies search filters to limit the results to size 9 and a color red. After seeing the results, the user adjusts the color filter to black. Finally, the user changes his or her mind and begins a new search for "t-shirt".

A conversation is simulated from this interaction as follows. 1) simulate the user starting a new mission by saying "I want some Nike shoes", 2) have the agent respond with a size question, 3) simulate the user continuing the mission by saying "size 9 please", 4) having the agent respond with a question about color, 5) simulate the user continuing the mission by saying the user asks "show me some in red", 6) having the agent respond with a question about price, 7) simulate the user continuing the mission by saying "how about black instead" (this simulates the user not responding directly to the agent's question, which can happen in conversations), 8) having the agent respond with some updated results and a question about material, and 9) simulate the user starting a new mission by saying "show me t-shirts". The utterances above are examples that may be generated by the natural language generation system as ways of expressing the same actions interactively.

Alternatively, the system aggregates behavior across a large number of users, and use the aggregated behavior to simulate individual sequences of actions as above. For example, the system may randomly select a query to start a new mission (possibly, but not necessarily, based on text query popularity on the site). From that query, the system knows which search filters or other actions would be available and which users typically use. The system then has the agent choose questions to ask or responses to show, and the system chooses values for the simulated user to "select" (possibly unrelated to the question chosen by the agent). The system knows how often users adjust previously selected filters (e.g. changing the price range, looking for a different color/brand, etc.), and uses that to inform those interactions. In this case, tracking the context is important in generating realistic conversations, so that our simulated user doesn't, for example, repeatedly specify the same color.

In such cases, the choices may be deterministic based on actual users or on the responses of an actual agent, randomly chosen based on popularity, uniformly randomly selected, selected to highlight difficult interactions (e.g. obscure brands, new missions that may look related to the current mission, etc.), or by some other method.

Some example embodiments use search filters for these steps. Other example embodiments extend the simulation to support other interactions related to the current mission. For example, the system simulates the user asking "what other colors does it come in" to see additional options, "what's the difference" in response to a question about memory sizes, etc. These examples may have direct correspondences with additional information surfaced in a traditional search engine (e.g. buying guides), but not necessarily so. In cases where there is no corresponding user interactions, the system approximates when and how the simulated user should perform that action.

Additionally, although this use case focuses one mission type, the example embodiments are applicable to other mission types. For example, a user may report a missing order by selecting that order, choosing a problem description, and writing a comment. The system can simulate this as a "feedback mission" by, for example, having the simulated user start a new mission by saying "I never received the shoes I ordered", and then perform actions from there. Additionally, the simulation may support both scripted scenarios and other more open-ended ones (like the shopping missions) in a similar way.

A step in this approach is natural language generation, where the simulator generates a natural language utterance that corresponds to the action the user desires. To be realistic, this utterance depends both on the desired action, as well as the current context of the conversation. For example, if the agent has just asked the user what color is wanted, then "black" and "black please" are natural ways a user may respond. However, if the agent has just asked the user what material is wanted, then "black" may be understood, but it wouldn't be a natural way of conveying that goal. Rather, a user would more likely say something like "do you have any in black?" or "can I see some black ones instead".

The utterances are dependent on the context plus the desired action. They may be generated via template instantiation, an LSTM neural network, or any number of alternative approaches. For example, if they are generated from templates, these templates may have slots where a desired value may be substituted (e.g. "do you have any in <COLOR>?"), and may contain a variety of different ways of expressing the same goal. Additionally, to make the utterances more realistic, the system may detect values that a user is unlikely to know and type, and transform them into something closer to how a user would express the data. For example, the search filter for heel height may be "Low (¾ in. to 1½ in.)", but a user is not likely to type that exactly. Rather, the user would say something like "low" or "1 inch". Finally, to make the utterances more realistic, the system may also apply some post-processing transformations to them, such as dropping some words, introducing misspellings, etc.

Figure 12:
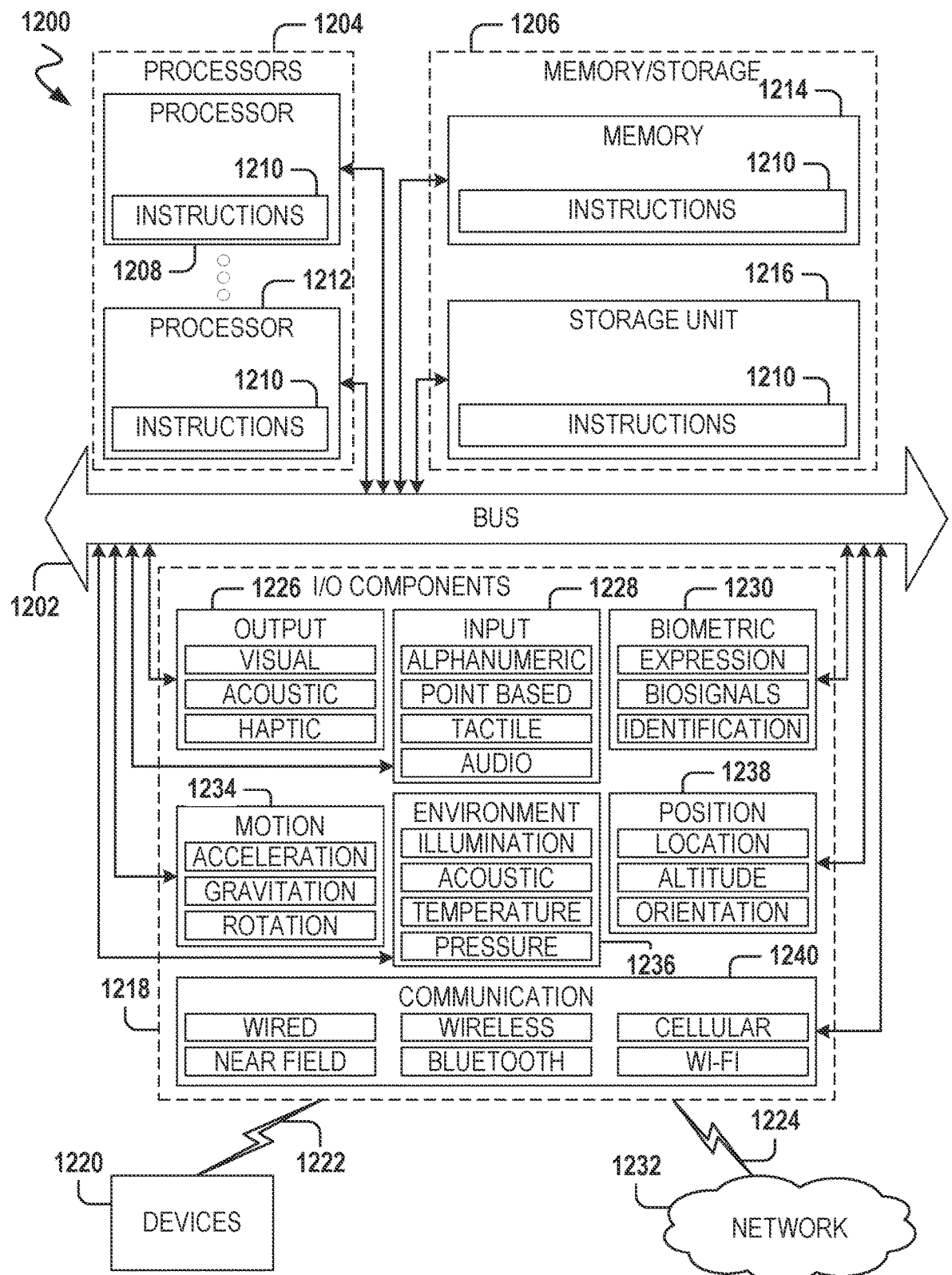
FIG. 12 is a block diagram illustrating an example of a software architecture that may be installed on a machine, according to some example embodiments.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. For example, the instructions 1210 may cause the machine 1200 to execute the example embodiments of FIGS. 1-11. Additionally, or alternatively, the instructions 1210 may implement the servers associated with the services and components of FIGS. 1-11, and so forth. The instructions 1210 transform the general, non-programmed machine 1200 into a particular machine 1200 programmed to carry out the described and illustrated functions in the manner described.

In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by the machine 1200. Further, while only a single machine 1200 is illustrated, the term "machine" shall also be taken to include a collection of machines 1200 that individually or jointly execute the instructions 1210 to perform any one or more of the methodologies discussed herein.

The machine 1200 may include processors 1204, memory/storage 1206, and I/O components 1218, which may be configured to communicate with each other such as via a bus 1202. In an example embodiment, the processors 1204 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1208 and a processor 1212 that may execute the instructions 1210. The term "processor" is intended to include multi-core processors that may comprise two or more independent processors (sometimes referred to as "cores") that may execute instructions contemporaneously. Although FIG. 12 shows multiple processors 1204, the machine 1200 may include a single processor with a single core, a single processor with multiple cores (e.g., a multi-core processor), multiple processors with a single core, multiple processors with multiples cores, or any combination thereof.

The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of the processors 1204 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1210. The term "machine-readable medium" shall also be taken to include any medium, or combination of multiple media, that is capable of storing instructions (e.g., instructions 1210) for execution by a machine (e.g., machine 1200), such that the instructions, when executed by one or more processors of the machine (e.g., processors 1204), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1218 may include a wide variety of components to receive input, provide output, produce output, transmit information, exchange information, capture measurements, and so on. The specific I/O components 1218 that are included in a particular machine will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion, and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environmental components 1236 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1238 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via a coupling 1224 and a coupling 1222, respectively. For example, the communication components 1240 may include a network interface component or other suitable device to interface with the network 1232. In further examples, the communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geo-location, location via Wi-Fi® signal triangulation, location via detecting an NFC beacon signal that may indicate a particular location, and so forth.

In various example embodiments, one or more portions of the network 1232 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1232 or a portion of the network 1232 may include a wireless or cellular network and the coupling 1224 may be a Code Division Multiple Access (CDMA) connection, a Global System for Mobile communications (GSM) connection, or another type of cellular or wireless coupling. In this example, the coupling 1224 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1210 may be transmitted or received over the network 1232 using a transmission medium via a network interface device (e.g., a network interface component included in the communication components 1240) and utilizing any one of a number of well-known transfer protocols (e.g., hypertext transfer protocol (HTTP)). Similarly, the instructions 1210 may be transmitted or received using a transmission medium via the coupling 1222 (e.g., a peer-to-peer coupling) to the devices 1220. The term "transmission medium" shall be taken to include any intangible medium that is capable of storing, encoding, or carrying the instructions 1210 for execution by the machine 1200, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
receiving, from a user device, user input as part of a conversation with an intelligent assistant, the conversation corresponding to a first product search mission for a product of a network-based marketplace;
determining, by one or more hardware processors, that the user input contains information related to continuing the first product search mission instead of changing to a second product search mission based at least in part on the user input and a context of the conversation, the first product search mission comprising searching for the product included in a first listing on the network-based marketplace and the second product search mission comprising searching for a second product included in a second listing on the network-based marketplace; and
generating a reply to the user input to further the first product search mission based at least in part on the user input and the context.

2. The method of claim 1, further comprising:
identifying a plurality of preceding user inputs included in the conversation corresponding to the first product search mission for the product of the network-based marketplace, wherein determining that the user input contains information related to continuing the first product search mission is based at least in part on the plurality of preceding user inputs.

3. The method of claim 1, wherein determining that the user input contains information related to continuing the first product search mission instead of changing to the second product search mission further comprises:
applying a machine-learned model to the user input and a plurality of preceding user inputs to determine that the user input contains information related to continuing the first product search mission instead of changing to the second product search mission.

4. The method of claim 1, wherein determining that the user input contains information related to continuing the first product search mission instead of changing to the second product search mission further comprises:
applying a machine-learned model to the user input and a plurality of preceding user inputs to determine a certainty of continuing the first product search mission.

5. The method of claim 1, further comprising:
identifying a first set of parameters associated with the user input and a second set of parameters associated with information for the product of the network-based marketplace, wherein determining that the user input contains information related to continuing the first product search mission is based at least in part on the first set of parameters and the second set of parameters.

6. The method of claim 1, further comprising:
identifying, from the user input, a set of explicit attributes associated with a user, wherein determining that the user input contains information related to continuing the first product search mission is based at least in part on the set of explicit attributes.

7. The method of claim 1, further comprising:
identifying, from the user input, a set of implicit attributes associated with a user, wherein determining that the user input contains information related to continuing the first product search mission is based at least in part on the set of implicit attributes.

8. The method of claim 1, further comprising:
receiving a second user input in response to the reply;
determining that the conversation corresponding to the first product search mission has concluded based at least in part on the second user input and the context of the conversation; and
generating a final reply to conclude the conversation corresponding to the first product search mission.

9. A system comprising:
a processor; and
a memory device storing instructions which, when executed by the processor, causes the system to perform operations comprising:
receiving, from a user device, user input as part of a conversation with an intelligent assistant, the conversation corresponding to a first product search mission for a product of a network-based marketplace;

determining, by one or more hardware processors, that the user input contains information related to continuing the first product search mission instead of changing to a second product search mission based at least in part on the user input and a context of the conversation the first product search mission comprising searching for the product included in a first listing on the network-based marketplace and the second product search mission comprising searching for a second product included in a second listing on the network-based marketplace; and generating a reply to the user input to further the first product search mission based at least in part on the user input and the context.

10. The system of claim 9, wherein the processor, when executing the instructions, causes the system to perform operations comprising:

identifying a plurality of preceding user inputs included in the conversation corresponding to the first product search mission for the product of the network-based marketplace, wherein determining that the user input contains information related to continuing the first product search mission is based at least in part on the plurality of preceding user inputs.

11. The system of claim 9, wherein the processor, when executing the instructions, causes the system to perform operations comprising:

applying a machine-learned model to the user input and a plurality of preceding user inputs to determine that the user input contains information related to continuing the first product search mission instead of changing to the second product search mission.

12. The system of claim 9, wherein the processor, when executing the instructions, causes the system to perform operations comprising:

applying a machine-learned model to the user input and a plurality of preceding user inputs to determine a certainty of continuing the first product search mission.

13. The system of claim 9, wherein the processor, when executing the instructions, causes the system to perform operations comprising:

identifying a first set of parameters associated with the user input and a second set of parameters associated with information for the product of the network-based marketplace, wherein determining that the user input contains information related to continuing the first product search mission is based at least in part on the first set of parameters and the second set of parameters.

14. The system of claim 9, wherein the processor, when executing the instructions, causes the system to perform operations comprising:

identifying, from the user input, a set of explicit attributes associated with a user, wherein determining that the user input contains information related to continuing the first product search mission is based at least in part on the set of explicit attributes.

15. The system of claim 9, wherein the processor, when executing the instructions, causes the system to perform operations comprising:

identifying, from the user input, a set of implicit attributes associated with a user, wherein determining that the user input contains information related to continuing the first product search mission is based at least in part on the set of implicit attributes.

16. The system of claim 9, wherein the processor, when executing the instructions, causes the system to perform operations comprising:

receiving a second user input in response to the reply;

determining that the conversation corresponding to the first product search mission has concluded based at least in part on the second user input and the context of the conversation; and generating a final reply to conclude the conversation corresponding to the first product search mission.

17. A non-transitory computer-readable medium comprising instructions which, when read by a machine, cause the machine to perform operations comprising:

receiving, from a user device, user input as part of a conversation with an intelligent assistant, the conversation corresponding to a first product search mission for a product of a network-based marketplace;

determining, by one or more hardware processors, that the user input contains information related to continuing the first product search mission instead of changing to a second product search mission based at least in part on the user input and a context of the conversation the first product search mission comprising searching for the product included in a first listing on the network-based marketplace and the second product search mission comprising searching for a second product included in a second listing on the network-based marketplace; and generating a reply to the user input to further the first product search mission based at least in part on the user input and the context.

18. The non-transitory computer-readable medium of claim 17, wherein the instructions further cause the machine to perform operations comprising:

identifying a plurality of preceding user inputs included in the conversation corresponding to the first product search mission for the product of the network-based marketplace, wherein determining that the user input contains information related to continuing the first product search mission is based at least in part on the plurality of preceding user inputs.

* * * * *